July 12, 1949. A. W. KEUFFEL ET AL Re. 23,133

MEASURING TAPE

Original Filed Sept. 25, 1940

INVENTORS
ADOLF W. KEUFFEL
GEORGE L. HENZEL

BY Orton and Griswold
ATTORNEY.

Reissued July 12, 1949 Re. 23,133

UNITED STATES PATENT OFFICE 23,133

MEASURING TAPE

Adolf W. Keuffel, Essex Fells, and George L. Henzel, Lyndhurst, N. J., assignors to Keuffel & Esser Company, Hoboken, N. J., a corporation of New Jersey Original No. 2,354,756, dated August 1, 1944, Serial No. 358,258, September 25, 1940. Application for reissue January 23, 1947, Serial No. 723,988

3 Claims. (Cl. 33—137)

This invention relates generally to graduated instruments such as measuring rules, tapes, scales and the like although not so limited. More particularly, the invention relates to flexible measuring tapes of the kind used by engineers, surveyors and others. The invention also relates to methods of making such graduated instruments.

The heretofore conventional and widely used method for making measuring tapes involved the basic procedure of applying an etch resist to selected areas on the surface of a strip of spring steel having suitable dimensions. The strip was then subjected to the action of an etching liquid which ate into the metal in the areas which were unprotected. Removal of the resist then provided the completed article. Obviously, there were many modifications of this basic procedure but the practical result was a tape with limited contrast and subject to rapid corrosion, further reducing the original legibility.

It has heretofore been proposed to provide measuring strips by electroplating selected areas. This has been suggested particularly for concavo-convex tapes. According to such procedures, a strip of base metal bent beyond its elastic limit to provide a concavo-convex cross-section had certain selected areas stopped off with a non-conducting material and the strip then electroplated to give a polished or highly reflective bright surface intended to provide some contrast with the area not coated and representing the base metal. The stopping-off material was then removed. The limited contrast of such graduations adjacent a highly reflective surface makes them difficult to read even in a concavo-convex tape. Even where a metal of what was termed a contrasting color was subsequently deposited in the depressions after the removal of the stopping-off material, such color was that of a metal other than a silvery white and lustrous metal and the limited contrast between the two highly reflective glossy metallic surfaces made reading difficult because of the specular reflection.

It is an object of the present invention to provide a highly legible graduated measuring instrument capable of resisting exposure to the weather, corrosive liquids, abrasion and other deleterious effects in normal use. Accordingly, a graduated member is provided having groups of indicia areas and groups of background areas, at least one of the groups being protected by a non-corrodible or difficultly corrodible metal, such as chromium electroplated on the base metal of the strip. A highly legible contrast is obtained by coloring one of the groups of areas or applying a coloring material thereto. Preferably such color does not have a glossy surface giving a specular reflection. By providing the adjacent areas with a diffused reflecting characteristic legible contrast is obtained with untreated areas. Also, by combining colored areas with adjacent or surrounding areas with a diffused reflection characteristic, legible contrast is obtained.

Another object of the invention is a graduated member having a highly legible contrast between the group of indicia areas and the group of background areas and in which one of said areas is formed by a metallic surface. In accordance with one aspect of the invention, one group of areas is colored or has coloring material applied thereto. Preferably, such color or coloring material does not have a so-called glossy surface giving a specular reflection. In accordance with another aspect of the invention, one of the groups of areas is provided with a surface having diffused reflecting characteristics. In accordance with still another aspect of the invention one group of areas is colored in any desired manner while the other group of areas is provided with a diffused reflecting characteristic.

A further object of the invention is a method of obtaining a corrosion resistant diffused reflecting surface or predetermined areas of a measuring strip or the like. According to one aspect of the invention a matte surface is formed on desired areas of the strip either by etching such areas or sandblasting or otherwise roughening the surface of the strip. In the alternative, a metallic coating may be applied to or deposited on selected areas of the strip which will have a diffused reflecting characteristic as the result of its composition or method of application.

It is another object of this invention to provide a graduated strip of high original legibility that will withstand severe abrasion or exposure to ordinarily corrosive materials and in which the legibility of the graduations, for instance, will be preserved. To this end there is applied to selected areas of the strip an ink resist which will color the surface of the metal so that, if the resist is worn away, the surface color remains.

Yet a further object of the invention is a graduated strip of high original legibility that will withstand severe abrasion or exposure to ordinary corrosive materials in which the legibility of the graduations, for instance, will be automatically restored. To this end, a pigmented material may be applied to predetermined areas of a strip of such metal that, when the applied material is worn away, oxidation of the metal so exposed will restore the contrast.

The invention also seeks a measuring strip which is practical from the standpoint of accuracy in manufacture and high legibility and durability in use.

In carrying the invention into effect a strip of base metal, such as steel, is so treated that one group of areas, say, indicia areas have an appearance which when contrasted with adjacent areas affords legible contrast. One group of areas may be colored, as by a pigmented coating composition, while the other group of areas may be comprised of a metal with diffused reflecting characteristics. Preferably, one or more protective coatings say of nickel or chromium, or chromium superimposed upon a nickel coating is applied to the base metal.

These and er objects of the invention and the means fo1 their attainment will be more apparent from the following detailed description, taken in connection with the accompanying drawing illustrating various embodiments by which the invention may be realized, and in which.

Figure 1:
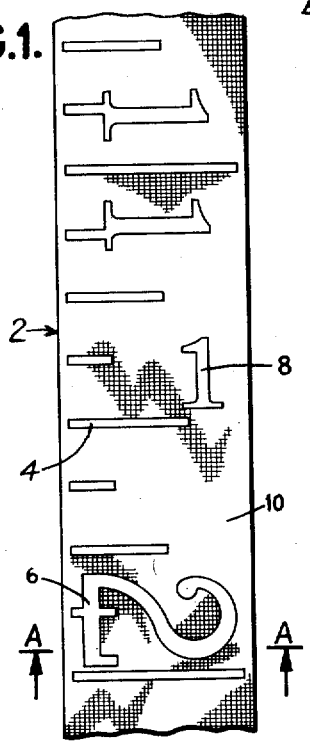
Figure 1 is a view in plan illustrating that embodiment of the invention in which the background areas comprise a matte finish electroplated metal.

Referring particularly to Figure 1, there is shown a metal strip 2 having depicted thereon indicia such as the graduations 4 and numerals 6 which, on a measuring tape, serve to indicate feet and inches. In addition, characters 8 may be used to indicate the number of feet from the end of the tape without direct reference to an adjacent foot mark. In the embodiment of Figure 1, background areas 10 are of non-corrodible or difficultly corrodible metal having a matte finish. Numerals 6 and 8 as well as graduations 4 are all indicia formed either by an ink resist or other color in accordance with any of the modifications hereinbefore described and further referred to hereinafter.

Figure 2:
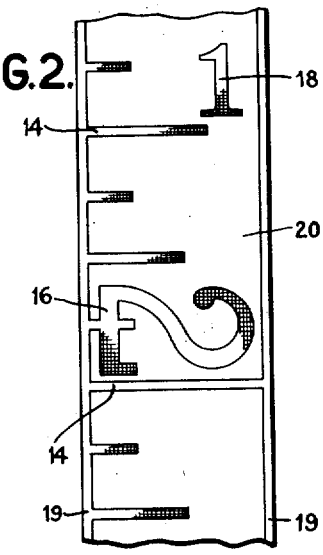
Figure 2 is a view in plan showing an embodiment of this invention in which the graduations are electroplated metals to contrast with a colored background.

Figure 2 illustrates a measuring tape which may be considered generally the reverse of that shown in Figure 1 in that the indicia, i. e., the graduations 14, numerals 16 and 18 as well as beads 19, if present, are of difficultly corrodible or noncorrodible metal electrodeposited on the metal strip and the background areas 20 are of contrasting color as an ink resist or surface color on the base metal or an intermediate layer of metal. The principles of this invention as embodied in the several illustrated modifications subsequently more particularly discussed, may be employed according to the general dispositions of either Figure 1 or of Figure 2.

The base material is, for most practical purposes, a flexible strip of hardened and tempered high carbon spring steel of the type heretofore used for etched tapes and of suitable dimensions depending upon the use to which the measuring tape may be put. As prepared, such strips have a relatively bright surface protected against rust or corrosion by a film of oil. Other base strips of steel, copper, brass or other metals or alloys may be employed. In all instances, a preliminary degreasing and cleaning of the base metal is necessary. For a steel strip, treatment with a solution of an alkaline degreasing agent followed by an acid wash, a clear water wash and drying will give what is usually termed a "chemically clean" surface.

To carry out this invention, a number of alternative procedures may be followed and, in the discussion of the various steps which follow, it should be borne in mind that many of the individual steps represent alternative procedures which may or may not depend upon the nature of preceding steps.

While the chemically clean strip may be directly printed with a resist hereinafter more particularly described and a satisfactory tape obtained by the selection of the subsequent steps, it is preferred and frequently desirable to perform certain preliminary operations, several alternatives of which are given.

*Diffused reflection characteristics*

The clean strip may be given a diffused reflection characteristic. That is, while the surface of the strip may reflect light the light rays are not reflected as in specular reflection but are reflected in all directions. A matte surface has such diffused reflection characteristics. A surface having such characteristics may be produced by uniformly etching the surface of the strip with a solution of hydrochloric acid (18% by weight) at about 180° F. After washing and drying, the surface may be printed directly.

Alternatively, the base strip may be given a uniform etch with a 10% nitric acid solution at room temperature. The colored oxide formed is then removed, as by brushing, followed by pickling in a hydrochloric acid solution containing an inhibitor.

The matte surface may also be obtained by making the strip an anode in an electrolytic bath under conditions well known for electrolytic etching.

A matte surface is also obtainable by sandblasting or other abrasive action, conveniently followed by a slight exposure to acid.

*Coloring the surface*

Instead of a preliminary treatment to give a metal base with a matte surface, the surface may first be subjected to the action of various reagents which produce a colored surface on the base metal with or without providing anti-corrosive protection.

A concentrated solution of two parts of caustic soda and one part of sodium nitrite at 130° C. will give the base metal a black surface that is, however, acid soluble. Washing and brushing the surface after treatment with the reagent is necessary.

Where certain areas of the strip are not to be protected by a noncorrodible metal, it is, in some situations, desirable to subject the strip to a preliminary treatment with an agent for rust proofing as well as coloring the base steel. Such methods are well known and include, for example, a phosphate-phosphoric acid treatment at temperatures slightly above 200° F. which may be followed by a water wash and exposure to a solution of chromic acid at temperatures near, but preferably below, 200° F. This operation is completed by a water wash and drying.

Where color only is desired, the base strip, when of steel, may be given a blue surface by heating to temperatures which give what is known as a "blue temper."

Alternatively, the base may be treated with reagents which will give what is known as a "gun metal" finish.

A colored strip may also be obtained by using the nitric acid etch described above and then, immediately after removing the strip from the nitric acid solution, subjecting it to a 1 to 2% oxalic acid solution at about 85° F.

Base color may be secured, not only as part of the base metal, but in the form of an applied metal by electroplating or spraying. Suitable metals, among others, are copper, nickel, chromium and aluminum. The metal selected should be one which can be given a color by electrical or chemical treatment.

The surfaces of metal, such as steel, have a characteristic silver white appearance. The term color is herein used to distinguish from the natural glossy surfaces of metal, and is intended to cover colors obtained by heating, by colored compounds resulting from a reaction on the metal surface, by pigments or otherwise.

Two basic types of strips are produced by following the procedures above suggested; in one type, the strip has a metallic matte surface; in the other case, the base metal has a colored surface, usually dark, and substantially black or blue either smooth or roughened.

*Distinguishing the indicia and background areas*

To continue the process for preparing a graduated tape, a selected group of areas of the strip are coated with an electroplate resist according to a pattern to distinguish a group of indicia areas from a group of background areas.

In one modification of the invention, the electroplate resist is a pigmented ink which, in its general physical properties, resembles a printing ink and therefore can be applied with printing dies. The dies may be of the type which represent graduations and numerals, generically termed indicia, and, after the resist is applied, permanent adherence and further immunity to the electrolytic bath may be insured by baking. A suitable ink (resist) for this purpose includes an ink pigment, conveniently carbon black, a resinous vehicle that sets by condensation or polymerization when heated, in proportions of approximately two to one and a small amount of a drier for instance cobalt linoleate. The ink must be capable of withstanding the action of the electrolytic bath and, usually, the etching baths as well. The resist may be applied to those areas which are to represent background and, in this instance, baking may be even more important because of the relatively larger areas protected.

The resist may include constituents which will color the metal to which it is applied. For example, phosphoric acid or other similar compounds known to have rust proofing effects when included in a coating material will act to increase the resistance of the metal to corrosion and, at the same time, color the metal surface. Resists of this type herein referred to as etching inks are desirably applied to untreated chemically clean surfaces or the etched or matte surfaces.

The application of a resist as above described, provides a protective and nonconductive coating on selected areas of the base strip which areas will not be plated when the strip is connected as a cathode in an electrolytic bath.

If the base metal has received a preliminary treatment to color the surface before the application of the resist, this coloring must, in most instances, be removed from the areas which are to be electroplated to secure proper adherence. Since many resists are soluble in hydrochloric acid, this acid should be avoided where such is the case and care must be taken to etch with materials which will not dissolve the resist. Nitric acid or electrolytic etching is suggested. Naturally the etching which produces a matte surface will affect the background in those situations where the numerals and graduations are protected by the resist, and the graduations and numerals where the background is so protected.

*Coating*

The strip carrying a resist in selected areas may now be electroplated, if desired. A base plate of copper electro-deposited from a copper plating solution may be applied. In most instances, this is not necessary and the first electroplate, other than that which may have been applied to the entire strip is preferably nickel providing a nonporous plate. Where the base metal has been etched and has a matte surface, the nickel plate will have a corresponding matte surface. A matte nickel surface is essential either where the nickel is the final coating or when it is covered by a protective layer of chromium since the characteristics of the chromium plate are dependent on the base to which it is applied.

The electroplating operation for nickel may be from a bath of nickel ammonium sulphate with ammonium chloride and boric acid. Desirable results have been obtained where the base metal strip has been given a preliminary surface roughening treatment as by sandblasting or other abrasive action, conveniently, followed by a slight exposure to acid. Electroplates over such surfaces have an unusually white appearance as distinguished from the glossy appearance of a smooth polished metal surface.

In most instances it is preferred to apply a protective layer of chromium plate which will have a matte surface and this may be applied either directly to the prepared metal base or preferably over an intermediate layer of nickel in one of the conventional ways which are well known.

Carrying out the process as above described to this point will produce a serviceable graduated strip such as a measuring tape having an ink resist contrasting with a frosted metal but it is usually preferable to perform certain selected operations hereinafter described, depending, of course, upon the character of the steps which were employed up to this point. The exposed metal (as compared to that still covered by the resist) may be colored. A coating of black chrome may be applied over chromium plate by electrolytic deposition at about 20° C. but below 25° C. with a current density of six amperes per square inch in a bath containing 250 gms. of $CrO_3$ and 5 c. c. of glacial acetic acid per 1000 c. c. of water. The exposed metallic area may be given a coating of black nickel. Where aluminum has been applied, it may be given a treatment known as anodic oxidation and then the aluminum oxide so produced may be dyed a suitable color, preferably black.

Alternatively, the resist may be removed and if the area covered by the resist is one which before the electroplating was colored by a preliminary treatment such as that described, the tape will have legible color contrast. Where such preliminary coloring has not been effected, after the resist is removed the strip may be treated with nitric acid followed by oxalic acid as above described. It may be subjected to the action of an oxidizing agent or that of a sulphide. Treatment with a concentrated solution of caustic soda and sodium nitrite will provide an alkali black. The application of heat to give a blue temper will color the strip and also remove hydrogen occluded as the result of any previous etching or the electroplating. The step of heating should be employed in almost every instance, even though not carried to the point of blue temper, to remove this embrittling hydrogen. Other means of coloring including the gun metal treatment, and the combined rust proofing and chromic acid treatments can also be used. Where the electroplated layers are of any substantial thickness, the recesses from which the resist has been removed may be filled with a pigmented lacquer. The pigmented lacquer may include compounds which will act to color the metal beneath which coloring will be independent of the presence of the lacquer.

Where a uniform coating of metal has been applied over the entire strip and portions of it are exposed by the removal of the resist, it may be colored in various ways. If it is copper, it can be given a sulphide treatment or subjected to copper sulphate and ammonium hydroxide to give a black coating.

Figure 3:
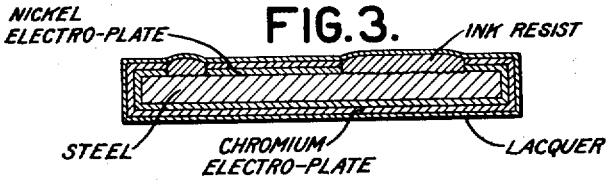
Figure 3 to 9 are views in section along the line A—A of Figure 1 illustrating the various products obtained by practicing some of the procedures herein described.

A graduated strip having a cross-section as illustrated in Figure 3 is conveniently prepared by printing a metal strip with a resist which is also a pigmented ink and thereafter electroplating with one or more metals which will plate those layers not covered by the resist. The diffused reflection characteristic of the strip obtained on the exposed surface of the electroplated metal may be obtained by a matte finish formed by treating the surface on one of the lower layers, for instance by a preliminary etch of the base steel. The electroplated metal may be, and preferably is, two layers, i. e., nickel and chromium. These layers, formed by electro-deposition, may be relatively thin and not of the relative dimensions shown in the drawing, which are, of necessity, magnified for clarity of illustration. The clear lacquer top coat, which is applied, serves as a protective layer. A measuring strip prepared in accordance with this modification, and as illustrated in Figure 3, has contrast between the pigmented ink resist and the matte finish electroplate. Heavy wear will gradually remove the ink resist and exposure of the steel beneath the resist will result in there being substantially no contrast. Should, however, the strip be subjected to any corrosive action such as will cause rusting, as by exposure to the elements in use, the brown oxide will provide contrast with the more resistant electroplate and the legibility of the tape will be automatically restored. This characteristic is true of many of the other products formed by following the teachings of this invention.

Figure 4:
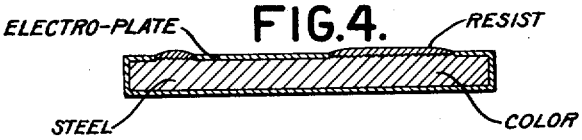

In Figure 4, there is shown a view, in cross-section, of a tape prepared by first coloring the steel strip in a manner to produce a color as by the caustic soda-sodium nitrite treatment described hereinbefore or the etching plus oxalic acid treatment, among others. After such treatment, which colors the entire surface of the steel, the resist, which is also preferably a pigmented ink, is applied and the strip subjected to an etching or pickling action which will remove the color from all areas not protected by the resist and provide a matte surface receptive to electroplating. The prepared strip is then given one or more layers of electroplate to provide a completed article with the ink resist as part of the finished product. Wear, which removes the resist, will result in exposing the color on the steel on those areas originally covered by the resist and contrast is retained.

Figure 5:
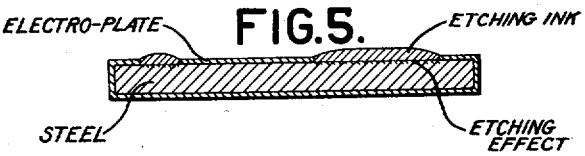

As illustrated in Figure 5, the preliminary treatment of the strip to color the entire surface may be avoided by applying a pigmented ink resist (etching ink) which contains salts reactive with the steel to color its surface and which may, in at least some situations, also provide a rustproofing action. The desired areas of the strip are printed with the ink resist and the strip then electroplated. The reactive salts in the ink gradually react with the surface of the steel and, if the ink is worn away, there is a colored protective coating providing contrast to insure continued legibility.

Figure 6:
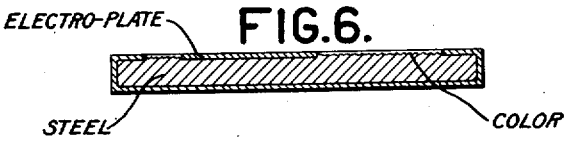

Considering now the modification illustrated in Figure 6 where the resist employed is either not pigmented or is otherwise of a type which will not remain as a permanent feature of the tape, it may, after having served its purpose for controlling the areas etched or electroplated, be removed and thereby expose the plain steel underneath. The exposed plain steel surface, exhibiting a metallic luster will usually have little or no contrast with the electroplate. However, a color can be developed on such exposed surface in any of the ways suggested herein as well as others which may occur to those skilled in the art for developing a color on an exposed metal surface.

Figure 7:
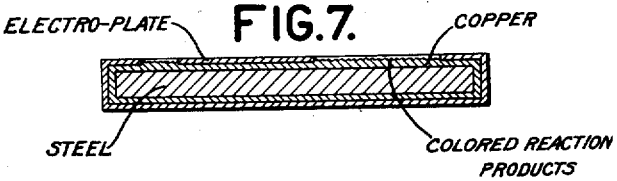

The product illustrated in Figure 7 generally resembles that of Figure 6 except that the base steel was given a preliminary complete coating of copper on which the resist was applied. After removal of the resist upon the completion of the subsequent electroplating operations, the copper was treated to form colored reaction products as, for example, black to contrast with the matte electroplate.

Figure 8:
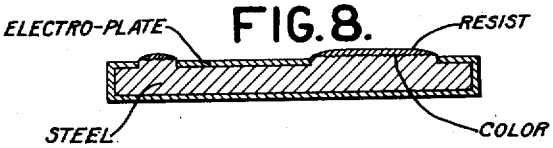

Reference is now made to Figure 8. In some instances it may be desired to produce a strip in which the indicia is substantially higher or lower than the background and, since only relatively small elevational difference can be readily obtained by electroplating, this may be accomplished by preliminary treatment to produce a product as shown in this figure. This product may be obtained by treating the base metal strip of steel to provide a colored surface over its entire area and then applying the resist to those areas which are to represent graduations and numerals. Obviously, the resist can, in the alternative, be applied to the background areas. The strip is then subjected to a substantial etch whereby the remainder of the surface is eaten away to a level considerably, i. e., one or two thousandths of an inch, below the original surface. When the strip is then electroplated with one or more relatively thin layers of metal, the graduations will project beyond the surface. The resist may be left on the relatively elevated areas or removed to expose the color. It is also possible to uniformly plate the etched strip after removal of the original resist, then apply a resist to the depressed areas and remove the plate from the elevated areas. According to an alternative procedure, after the uniform electroplate on the etched tape has been applied, it is removed from the elevated areas by abrasive action as in wet grinding and the areas then colored.

Figure 9:
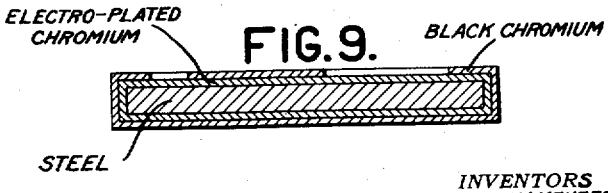

A further embodiment of the invention is illustrated in Figure 9, wherein the steel strip is uniformly electroplated as, for example, with a layer of nickel and another layer of chromium and the resist applied to the selected areas of the chromium plate. Thereafter the exposed areas are given a coating of black chromium. Upon removal of the resist, the surface of the electroplated chromium forming, for example, graduations and numerals, contrasts with the black chromium which may form the background.

In all of the various embodiments of the invention illustrated in Figures 3 to 9, it will be evident that an over coat of a clear lacquer may be applied as a finish. The hereinbefore description of the graduated strips and the corresponding illustrations in Figures 3 through 9 are generally directed to the type of graduated strip of the Figure 1 modification but by reversal of disposition, strips similar to the Figure 2 modification can be produced.

While the invention has been described as applied to certain preferred embodiments and by reference to the details of the steps which may be involved in these processes, this is to be considered simply as illustrative of the invention and not in limitation thereof, the scope of the invention being set forth in the appended claims.

What is claimed is:

1. A highly legible durable measuring device comprising a metallic strip a surface of which is provided with an indicia area and a background area, a resist reactive with the surface of said metallic strip disposed upon one of said areas whereby to color said area of said metallic strip the other area of the metallic strip having a matte surface and an outer coating of metal on the said last named surface and which has assumed the matte characteristics of the underlying matte surface.

2. In the method of making a graduated strip, the steps which comprise etching a ribbon of steel to produce a surface thereon having diffused reflecting characteristics, applying electroplate resist comprising constituents to color the metal to predetermined areas of the strip and electroplating a coating of metal on the areas of the strip not covered by the resist.

3. The method of making a measuring tape comprising the steps of coloring the normal metallic surface of a steel strip while retaining its other surface characteristics by reacting it with a basic solution of a nitrite, the metal of said steel strip forming one of the reactants, coating predetermined areas of the strip colored by the chemical reaction with an electroplate resist according to a pattern of graduations and indicia, applying a reagent to the strip to remove the reaction products which colored the strip from the exposed areas which are not protected by the electroplate resist, and electroplating a coating of metal on the areas of the strip from which the colored reaction products have been removed and which are not covered by the resist.

ADOLF W. KEUFFEL.
GEORGE L. HENZEL.

REFERENCES CITED

The following references are of record in the file of this patent:

UNITED STATES PATENTS

| Number | Name | Date |
|---|---|---|
| 1,578,254 | Bennett | Mar. 30, 1926 |
| 1,745,912 | Richardson | Feb. 4, 1930 |
| 1,792,082 | Fink et al. | Feb. 10, 1931 |
| 1,828,401 | Farrand | Oct. 20, 1931 |
| 1,838,273 | McBride | Dec. 29, 1931 |
| 2,050,941 | Farrand | Aug. 11, 1936 |
| 2,314,915 | Witchger | Mar. 30, 1943 |
| Re. 22,908 | Witchger | Aug. 12, 1947 |
| 2,426,962 | Witchger | Sept. 2, 1947 |